(12) United States Patent
Tewfik et al.

(10) Patent No.: US 8,149,961 B1
(45) Date of Patent: Apr. 3, 2012

(54) RANGING IN MULTI-BAND COMMUNICATION SYSTEMS

(75) Inventors: Ahmed H. Tewfik, Edina, MN (US); Ebrahim Saberinia, Las Vegas, NV (US)

(73) Assignee: Regents of the University of Minnesota, St. Paul, MN (US)

( * ) Notice: Subject to any disclaimer, the term of this patent is extended or adjusted under 35 U.S.C. 154(b) by 960 days.

(21) Appl. No.: 10/912,515

(22) Filed: Aug. 4, 2004

Related U.S. Application Data

(60) Provisional application No. 60/492,608, filed on Aug. 4, 2003.

(51) Int. Cl.
*H03D 1/00* (2006.01)
(52) U.S. Cl. ........ 375/343; 375/259; 370/320; 708/300; 708/422
(58) Field of Classification Search .............. 375/343, 375/259; 370/320; 708/300, 422
See application file for complete search history.

(56) References Cited

U.S. PATENT DOCUMENTS

| | | | |
|---|---|---|---|
| 4,116,103 A | 9/1978 | Deutsch | |
| 5,677,927 A | 10/1997 | Fullerton et al. | |
| 5,790,784 A * | 8/1998 | Beale et al. | 370/520 |
| 5,802,044 A * | 9/1998 | Baum et al. | 370/330 |
| 5,960,031 A | 9/1999 | Fullerton et al. | |
| 5,984,514 A | 11/1999 | Greene et al. | |
| 6,154,484 A | 11/2000 | Lee et al. | |
| 6,331,997 B1 | 12/2001 | Li | |
| 6,735,398 B1 | 5/2004 | Izadpanah et al. | |
| 6,888,887 B1 | 5/2005 | Shattil | |
| 7,212,569 B1 * | 5/2007 | Clark | 375/233 |
| 7,489,665 B1 | 2/2009 | Tewfik et al. | |
| 2003/0014242 A1 | 1/2003 | Ananthpadmanabhan et al. | |
| 2003/0016773 A1 * | 1/2003 | Atungsiri et al. | 375/355 |
| 2003/0058787 A1 * | 3/2003 | Vandenameele-Lepla | 370/206 |
| 2004/0001534 A1 | 1/2004 | Yang | |
| 2004/0005016 A1 | 1/2004 | Tewfik et al. | |
| 2004/0008759 A1 | 1/2004 | Yang | |
| 2004/0120299 A1 * | 6/2004 | Kidiyarova-Shevchenko et al. | 370/342 |
| 2004/0215450 A1 | 10/2004 | Lin | |
| 2005/0100102 A1 | 5/2005 | Gazdzinski et al. | |
| 2005/0228654 A1 | 10/2005 | Prieto et al. | |

OTHER PUBLICATIONS

"IEEE 802.15 WPAN High Bit Rate Alternative PHY Task Group 3a (TG3a)", [online]. [archived on Feb. 16, 2003]. Retrieved from the Internet: <http://web.archive.org/web/20030216045000/http://www.ieee802.org/15/pub/TG3a.html>, 2 pgs.
Aziz, P. M., et al., "An Overview of Sigma-Delta Converters", *IEEE Signal Processing Magazine*, (Jan. 1996), 61-94.

(Continued)

*Primary Examiner* — Shuwang Liu
*Assistant Examiner* — Michael Neff
(74) *Attorney, Agent, or Firm* — Schwegman, Lundberg & Woessner, P.A.

(57) ABSTRACT

System and methods include transmitting the same signal in all sub-bands in different time intervals and processing the corresponding received signals to achieve a time resolution proportional to the inverse of the whole bandwidth as opposed to that of a single sub-band. The systems and methods refine the coarse resolution that is achieved by conventional approaches, such as the correlation method, in a single sub-band by aligning the outputs of the matched filters to the received signals from all sub-bands and applying a fast Fourier Transform (FFT) in each time bin along the sub-band index.

6 Claims, 4 Drawing Sheets

OTHER PUBLICATIONS

Caffery, J. J., et al., "Vehicle Location and Tracking for IVHS in CDMA Microcells", *5th IEEE International Symposium on Wireless Networks—Catching the Mobile Future*, vol. 4 (1994), 1227-1231.

De Mateo Garcia, J. C., et al., "Effects of Bandpass Sigma-Delta Modulation on OFDM Signals", *IEEE Transactions on Consumer Electronics*, 45(2), (May, 1999), 318-326.

Foerster, J. R., "The Effects of Multipath Interference on the Performance of UWB Systems in an Indoor Wireless Channel", *53rd IEEE Vehicle Technology Conference (VTC 2001 Spring)*, vol. 2 (2001),1176-1180.

Fontana, R. J., et al., "An Ultra Wideband Communications Link for Unmanned Vehicle Applications", *Association for Unmanned Vehicle Systems International* (AUVSI '97), (Jun. 1997), 6 pgs.

Gerakoulis, D., et al., "An Interference Suppressing OFDM System for Ultra Wide Bandwidth Radio Channels", *Proceedings of the IEEE Conference on Ultra Wideband Systems and Technologies*, (2002),259-264.

Gerakoulis, D., et al., "Link Performance of an Ultra Wide Bandwidth Wireless In-Home Network", *Proceedings of the Seventh International Symposium on Computers and Communications (ISCC '02)*, (2002), 699-704.

Golomb, S. W., "Two-Valued Sequences With Perfect Periodic Autocorrelation", *IEEE Transactions on Aerospace and Electronic Systems*, 28(2), (Apr. 1992), 383-386.

Gupta, R., et al., "Capacity of Ultra-Wideband OFDM", *57th IEEE Semiannual Vehicle Technology Conference (VTC 2003 Spring)*, vol. 2, (2003), 1420-1424.

Kay, S. M., "Table of Contents", *Fundamentals of Statistical Signal Processing: Estimation Theory*, PTR Prentice-Hall, Inc., Englewood Cliffs, NJ, (1993), 6 pgs.

Proakis, J., "Table of Contents", *Digital Communications*, (4th Edition, McGraw-Hill),(Aug. 15, 2000), 3 pgs.

Saberinia, E., et al., "All-Digital Receiver Structures for MC-UWB Systems", *Proceedings, IEEE 58th Vehicular Technology Conference (VTC 2003)*, vol. 1, (2003), 289-293.

Saberinia, E., et al., "Generating UWB-OFDM Signal Using Sigma-Delta Modulator", *57th IEEE Semiannual Vehicular Conference (VTC 2003 Spring)*, vol. 2, (2003), 1425-1429.

Saberinia, E., et al., "N-Tone Sigma-Delta UWB-OFDM Transmitter and Receiver", *IEEE International Conference on Acoustics, Speech, and Signal Processing 2003 (ICASSP '03)*, vol. 4, (2003), IV-129-IV-132.

Saberinia, E., et al., "Pilot Assisted Multi-User UWB Communications", *57th IEEE Semiannual Vehicle Technical Conference (VTC 2003)*, (2003), 5 pgs.

Saberinia, E., et al., "Ranging in Multi-Band Communications Systems", *IEEE 59th Vehicular Technology Conference (VTC 2004-Spring)*, (May, 2004),2248-2251.

Saberinia, E., et al., "Receiver Structures for Multi-Carrier UWB Systems", *Proceedings, Seventh International Symposium on Signal Processing and its Applications (ISSP 2003)*, (Jul. 2003), 313-316.

Saberinia, E., et al., "Single and Multi-Carrier UWB Communications", *Proceedings, Seventh International Symposium on Signal Processing and Its Applications (ISSPA 2003)*, (Jul. 2003), 343-346.

Saberinia, E., et al., "Synchronous UWB-OFDM", *IEEE International Symposium on Advances in Wireless Communications 2002 (ISWC '02)*, (Sep. 2002),41-42.

Saberinia, E., et al., "Waveform and Receiver Design for Synchronous UWB-OFDM", *Proceedings, 2nd IEEE International Symposium on Signal Processing and Information Technology (ISSPIT '02)*, (2002), 5 pgs.

Tewfik, A. H., et al., "High Bit Rate Ultra-Wideband OFDM", *Proceedings of the IEEE Global Telecommunications Conference 2002 (GLOBECOM '02)*, vol. 3, (Nov. 2002), 2260-2264.

Wang, Z., et al., "Wireless Multicarrier Communications—Where Fourier Meets Shannon", *IEEE Signal Processing Magazine*, 17(3), (May, 2000), 29-48.

Werb, J., et al., "Designing a Positioning System for Finding Things and People Indoors", *IEEE Spectrum*, 35(9), (Sep. 1998), 71-78.

Win, M. Z., et al., "Ultra-Wide Bandwidth Time-Hopping Spread-Spectrum Impulse Radio for Wireless Multiple-Access Communications", *IEEE Transactions on Communications*, 48(4), (2000), 679-691.

\* cited by examiner

Variance of normalized error versus
SNR for both averaging and FFT
schemes for N=4.

Variance of normalized error versus SNR for FFT scheme with and without phase mismatch between sub-bands for N=4.

RANGING IN MULTI-BAND COMMUNICATION SYSTEMS

RELATED FILES

This application is related to U.S. patent application Ser. No. 10/191,769, entitled "HIGH BIT RATE ULTRA-WIDE-BAND OFDM", filed on Jul. 8, 2002; U.S. patent application Ser. No. 10/693,651, entitled "GENERATING UWB-OFDM SIGNAL USING SIGMA-DELTA MODULATOR", filed on Oct. 24, 2003; and claims the benefit of U.S. Application No. 60/492,608, filed Aug. 4, 2003, each of which are hereby incorporated herein by reference for all purposes.

STATEMENT OF GOVERNMENT RIGHTS

This invention was made in part with a grant from the Government of the United States of America (award no. CCR-0313224 from the National Science Foundation). The Government may have certain rights in the invention.

FIELD

The present invention relates generally to communications systems and more particularly to systems and methods for range estimation and time resolution in multi-band communication systems.

BACKGROUND

Ranging or location awareness is a desirable feature in wireless networks, with applications ranging from military to safety, emergency (E911) and robotics. Research on the topic in wireless networks initially focused on outdoor cellular systems. These results were then extended to wireless local and personal area networks. Range estimation has received considerable attention in radar and sonar applications Ranging is equivalent to estimating the time of arrival of a known signal with a narrow correlation function. It is known that the time resolution, and therefore the precision of range estimation, in any system is generally inversely proportional to the transmitted signal bandwidth.

Multi-band communication systems have been proposed for wireless personal area networks (WPANs). In a multi-band system where only a portion of the total bandwidth is available to any transmission, the resolution appears to be proportional to the inverse of the bandwidth of a sub-band. As a result, the resolution in a multi-band system may be inaccurately determined. In some previous systems, the estimates from different sub-bands is averaged in an attempt reduce the effect of noise. In view of the inaccurate determination of resolution in previous multi-band systems, there is a need in the art for the present invention.

SUMMARY

The above-mentioned shortcomings, disadvantages and problems are addressed by the present invention, which will be understood by reading and studying the following specification. The systems and methods of the inventive subject matter provide high time resolution signals multi-band communication systems.

On aspect of the system and methods includes transmitting the same signal in all sub-bands in different time intervals and processing the corresponding received signals to achieve a time resolution proportional to the inverse of the whole bandwidth as opposed to that of a single sub-band. The systems and methods refine the coarse resolution that is achieved by conventional approaches, such as the correlation method, in a single sub-band by aligning the outputs of the matched filters to the received signals from all sub-bands and applying a fast Fourier Transform (FFT) in each time bin along the sub-band index.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
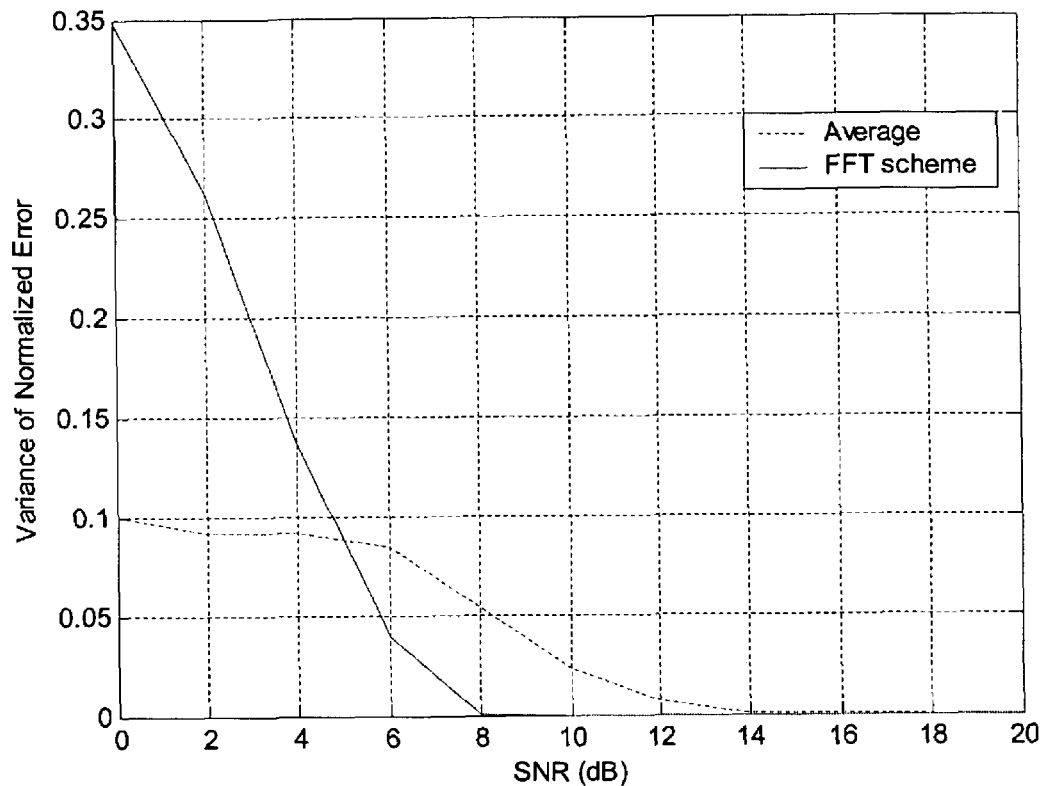
FIG. 1 is a graph that illustrates variance of normalized error versus SNR for both averaging and FFT schemes according to embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

I. Introduction

The systems and methods of the inventive subject matter provide high time resolution signals multi-band communication systems. Examples of such multi-band systems include the multi-band OFDM proposal to the IEEE 802.15.3a standard. This proposal is supported by the Multi-band OFDM Alliance (MBOA), a group of companies and universities that includes the University of Minnesota. In some environments in which the inventive subject matter may be implemented, the ultra wide bandwidth spectrum is divided into several sub-bands. In each time interval, a signal is transmitted over only one sub-band. The system then switches to another sub-band to send another signal. Therefore, in any time interval a signal can be sent with a bandwidth equal to that of a single sub-band.

On aspect of the system and methods includes transmitting the same signal in all sub-bands in different time intervals and processing the corresponding received signals to achieve a time resolution proportional to the inverse of the whole bandwidth as opposed to that of a single sub-band. The systems and methods refine the coarse resolution that is achieved by conventional approaches, such as the correlation method, in a single sub-band by aligning the outputs of the matched filters to the received signals from all sub-bands and applying a fast Fourier Transform (FFT) in each time bin along the sub-band index. Thus the systems and methods of some embodiments achieve a resolution that is substantially inversely proportional to the number of sub-bands multiplied by the bandwidth of a sub-band, i.e., to the total bandwidth of the multi-band system. Additionally, some embodiments exploit the information of delay that is carried by the center frequencies of each sub-band to achieve better time resolution. This information may appears as a phase factor in each received signal. Thus in some embodiments, it is desirable that there be little phase mismatch when the transmitter switches from one sub-band to another. In alternative embodiments, phase mismatches may be estimated and compensated for at the receiver before applying the FFT. Simulation results are discussed below to show how some embodiments perform in the presence of phase mismatch. Simulation results are also provided to show the performance of the systems and methods in the presence of additive white Gaussian noise (AWGN).

The detailed description is organized as follows: Section II describes a delay estimation for multi-band systems which uses maximum likelihood (ML) estimation in each sub-band and then averages over the estimates. Section III describes systems and methods of various embodiments of the inventive subject matter, including a description of a method using digital signal processing. Section IV describes embodiments of the inventive subject matter with respect to a multi-band OFDM scheme. Simulation results comparing the performance of the scheme with the traditional method are provided for different signal to noise ratios are presented in section V.

II. Delay Estimation

The maximum likelihood (ML) estimate of a delay may be computed by correlating the delayed signal with a copy of the original signal and declaring the time at which the maximum output occurs as the estimate of the delay. To achieve optimal resolution, it is desirable that the signal have a narrow autocorrelation function. The system bandwidth generally puts a limit on the resolution of the delay estimation since it affects the width of the main lobe of the autocorrelation function. The effect of the bandwidth of the transmitted signal on the delay estimation accuracy can also be explained by examining the Cramer-Rao lower bound (CRLB) for the variance of the estimation error. For the simple case where the received signal can be modeled as:

$$r(t)=s(t-\tau)+n(t) \tag{1}$$

where s(t) is a known signal and r is an unknown delay to be estimated, the CRLB is given by:

$$\sigma^2 \geq 1[(E_s/2N_0) \cdot w^2] = 1/[(P_s T/2N_0) \cdot w^2]. \tag{2}$$

In the above equation, $E_s$, $P_s$ and T are the energy, power and time duration of s(t) respectively. The additive white Gaussian noise (AWGN), n(t), has a density $N_0/2$. The variable w is the signals mean square bandwidth and may be defined by:

$$w^2 = \frac{\int \omega^2 |S(\omega)|^2 d\omega}{\int |S(\omega)|^2 d\omega} \tag{3}$$

where $S(\omega)$ is the Fourier transform of s(t). This bound is achievable by the ML estimator at high signal to noise ratios (SNR). For low or middle SNR regimes other bounds are tighter as described in A. Zeira and P. M. Schultheiss, "Realizable lower bounds for time delay estimation," IEEE Transactions on Signal Processing, vol. 41, Issue: 11, pp. 3102-3113, November 1993.

Equation (2) shows that the resolution of delay estimation, which can be measured by σ, is proportional to 1/w. In a multi-band system the total bandwidth is divided into several sub-bands. If a multi-band system with total band-width w has N sub-bands, then in a given time interval only a signal with bandwidth of $w_s$=w/N can be transmitted. Therefore, relying on the time delay estimation from a single sub-band transmission, the resolution will be proportional to $1/w_s$=N/w. In order to increase the accuracy by using all sub-bands, one way is to send a high resolution signal in all sub-bands and average the estimates to reduce the effect of noise. The performance of this scheme can be evaluated from equation (2) if it is assumed that the noises in different sub-bands are uncorrelated as:

$$\sigma_{ave}^2 = \sigma 2/N \approx 1/[(E_s/2N_0)^2 w_s^2 \cdot N]. \tag{4}$$

Then, the resolution that is achieved by this scheme is proportional to $1/\sqrt{N}w_s = \sqrt{N}/w$. It is desirable to obtain a resolution proportional to the total bandwidth, i.e. $1/(Nw_s)=1/w$. This resolution can be achieved using a receiver that processes the whole bandwidth. As described below, the systems and methods of various embodiments of the inventive subject matter provide a scheme that coherently processes the outputs of the normal multi-band system receiver that in a given time slot only processes a single sub-band.

III. Coherently Processing of Received Signals from All Sub-Bands

A. Model

Figure 4:
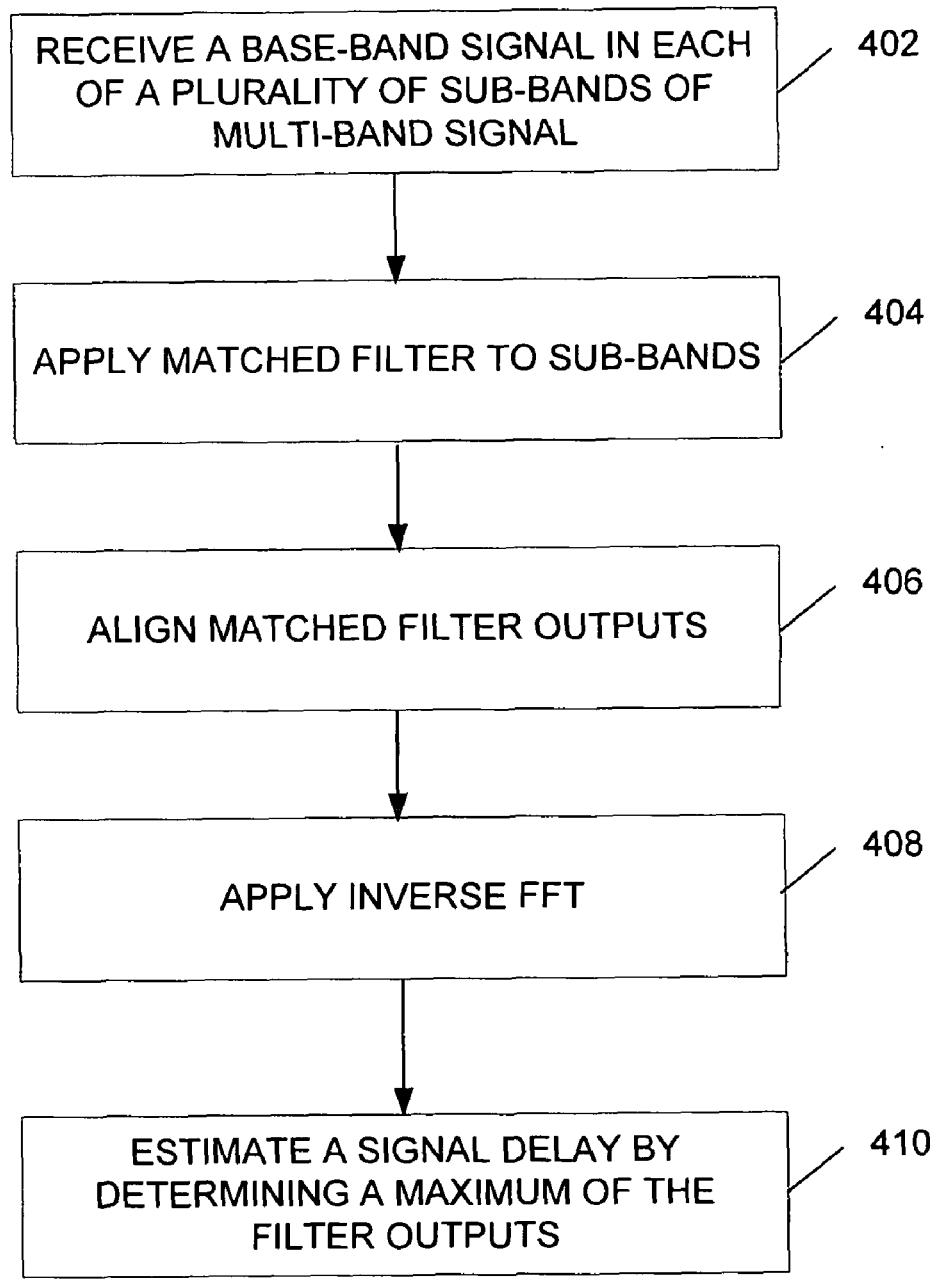
FIG. 4 is a flowchart illustrating a method according to embodiments of the invention.

Let x(t) be the high resolution base-band signal with bandwidth of $w_s$ that is transmitted in all sub-bands in different time intervals (FIG. 4, block 402). In an AWGN channel, N received signals may be given by:

$$r_n(t)=x(t-\tau_0)e^{j2\pi k w_c(t-\tau_0)}+w_n(t)$$

$$(n=0,\ldots,N-1) \quad (5)$$

where $\tau_0$ is an unknown delay and the AWGN processes $w_n(t)$ are independent, identically distributed with density $N_0/2$. In the receiver of a normal multi-band system the received signal in each sub-band is down converted to the base-band and passed through a filter matched to x(t) (FIG. 4, block 404). The output of the matched filter corresponding to the nth sub-band is equal to:

$$y_n(t) = \int_{-\infty}^{+\infty} (r_n(u)e^{-j2\pi n w_s u})x^*(u-t)du = e^{-j2\pi n w_s \tau_0}R_x(t-\tau_0) + v_n(t) \quad (6)$$

$$n = 0, \ldots, N-1$$

where $R_x(\tau)$ is the autocorrelation function of x(t) and may be defined as:

$$R_x(\tau) = \int_{-\infty}^{+\infty} x(t-\tau)x^*(t)dt \quad (7)$$

and $v_n(t)$ is a filtered AWGN.

Equation (6) shows that the output signals are the autocorrelation function of x(t) modulated by an exponential. An estimate of the delay with resolution proportional to $1/w_s$ may be found from any of the signals above by finding the time that $|y_n(t)|$ has a maximum. But there is some information about the delay in the exponential term as well. For a fixed time value t, there is an exponential with unknown digital frequency ($w_s\tau_0$) along the sub-band index. In some embodiments, the information in the exponential may be used to refine the estimate obtained from the autocorrelation function from $1/w_s$ to $1/(Nw_s)$.

Some embodiments utilize this information by taking a digital Fourier transform (DFT) along the sub-band index. The resulting N signals in some embodiments have the following form:

$$z_m(t) = \sum_{n=0}^{N-1} y_n(kT_r)e^{j\frac{2\pi mn}{N}} \quad (8)$$

$$= R_p(t-\tau_0)\sum_{n=0}^{N-1} e^{-j2\pi n(w_s\tau_0-\frac{m}{N})} + u_m(t)$$

$$= R_p(t-\tau_0)\frac{\sin(2\pi n N(w_s\tau_0-\frac{m}{N}))}{\sin(2\pi n(w_s\tau_0-\frac{m}{N}))} + u_m(t)$$

$$m = 0, \ldots, N-1.$$

B. Estimation Resolution

It will now be shown quantitatively that the proposed scheme provides a resolution of $1/(Nw_s)$. First, assume that the delay is equal to $\tau_0=K/(Nw_s)$ for some integer K. The output signals in this case are equal to:

$$z_m(t) = R_p(t-\tau_0)\frac{\sin(2\pi n N(\frac{K}{N}-\frac{m}{N}))}{\sin(2\pi n(\frac{K}{N}-\frac{m}{N}))} + u_m(t) \quad (9)$$

$$m = 0, \ldots, N-1.$$

Neglecting the noise term, it is noted that the second component of the first term in (9) (the sin(•) term), will be zero except for those values of m such that m=K mod N. The autocorrelation $R_p(•)$ itself will have a peak at $\tau_0$. Therefore the delay K may be estimated with resolution one with ambiguity of N. This ambiguity may be removed by the autocorrelation function itself which provides a resolution of N to estimate K. Then K can be estimated without ambiguity with resolution one and the delay can be estimated with resolution $1/(Nw_s)$. This provides an enhancement by a factor of $1/\sqrt{N}$ compared to averaging scheme.

In summary, the refined estimate of the delay may be defined as the time point that $|z_m(t)|$ has the maximum among all m indices and the time axis.

C. Implementation

The previous discussion about resolution of various embodiments of the inventive subject matter also provides implementation methods for various embodiments of the inventive subject matter. Further details on implementation will now be provided. Since the autocorrecting function provides a resolution of $1/w_s$, the outputs of the matched filters 304 in any sub-band may be sampled, that is the signals $y_n(t)$, at a rate $w_s$. Then the outputs in a matrix Y may be aligned as follows (FIG. 4, block 406):

$$Y(m,n)=y_m(n/w_s) \quad (10)$$

Next, an inverse fast Fourier transform (IFFT) may be applied (FIG. 4, block 408) along the index m to get the matrix Z as:

$$Z=F^{-1}Y. \quad (11)$$

Let $(m_0,n_0)$ be the index at which $|Z|$ has a maximum. The estimate of the delay FIG. 4, block 410) is equal to:

$$\hat{\tau}_0=(m_0+Nn_0)/(Nw_s). \quad (12)$$

IV. Range Estimation in Exemplary Multi-Band OFDM Systems

Figure 3:
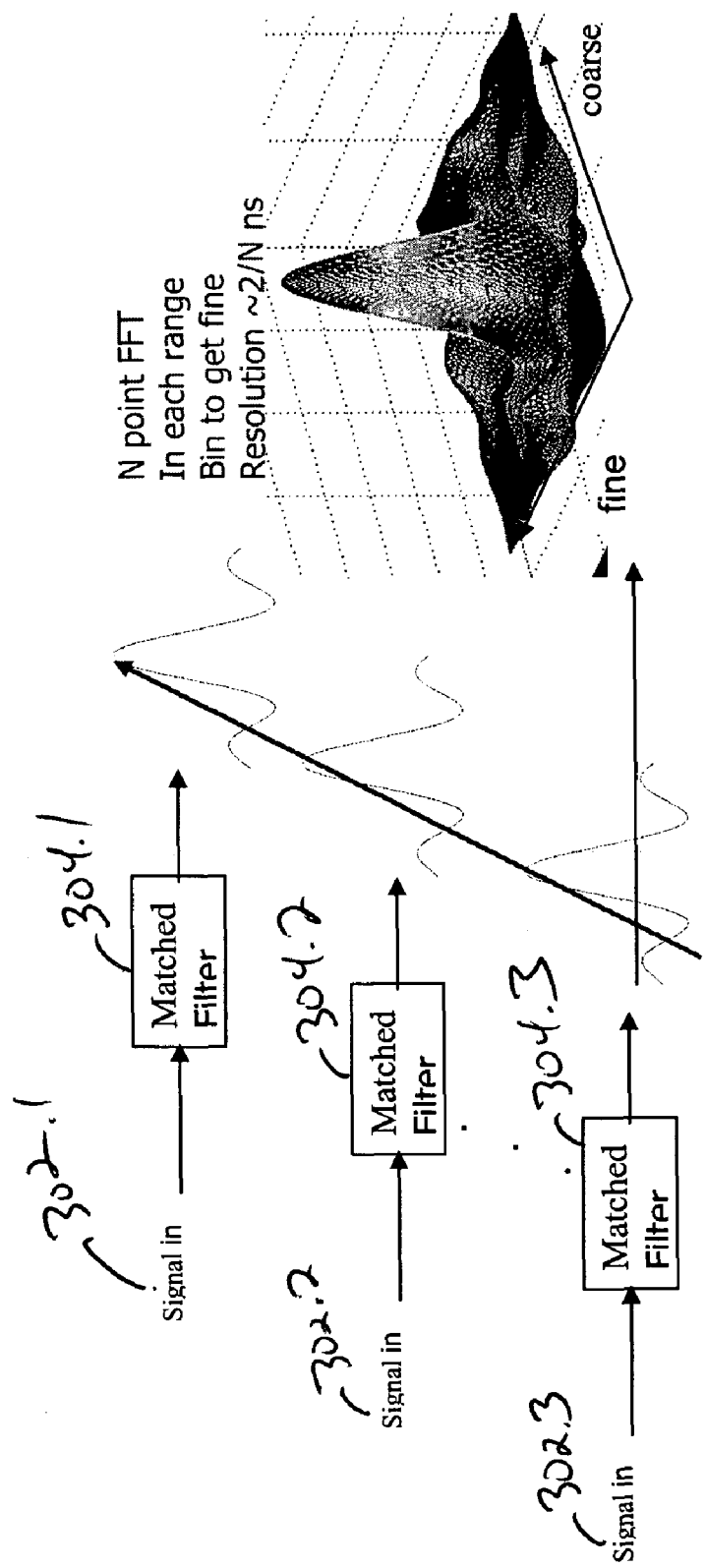
FIG. 3 illustrates an implementation for multi-band OFDM system according to embodiments of the invention.

FIG. 3 shows the application of the scheme to a system according to embodiments of the inventive subject matter. In some embodiments, the systems and methods of the embodiments of the inventive subject matter relate to the multi-band OFDM proposal for the IEEE 802.15.3a wireless personal area networks. Details the IEEE 802.15.3a may be found in Anuj Batra at al, "Multi-band OFDM: merged proposal #1," Merged proposal for the IEEE 802.15.3a standard, IEEE 802.15 work group official web site, http://grouper.ieee.org/groups/802/15/pub/2003/Nov03/Albuquerque, N. Mex., USA, November 2003. In this multi-band system, three sub-bands 302.1-302.3, each with bandwidth of 528 MHz, are used to transmit OFDM modulated signals. The total ultra wide bandwidth is equal to 1.584 GHz. Applying the methods of the various embodiments of the invention to this system with 3 transmissions, provides a resolution of 631.3 psec rather than 1.0935 nsec that is typical using an averaging method. The preamble of a data packet in an exemplary system contains 3 similar PN sequence for 3 sub-bands that can be used for time and range estimation. Those of skill in the art will appreciate that the systems and methods may be adapted to multi-band systems having more than 3 sub-bands.

V. Simulation Results

Figure 2:
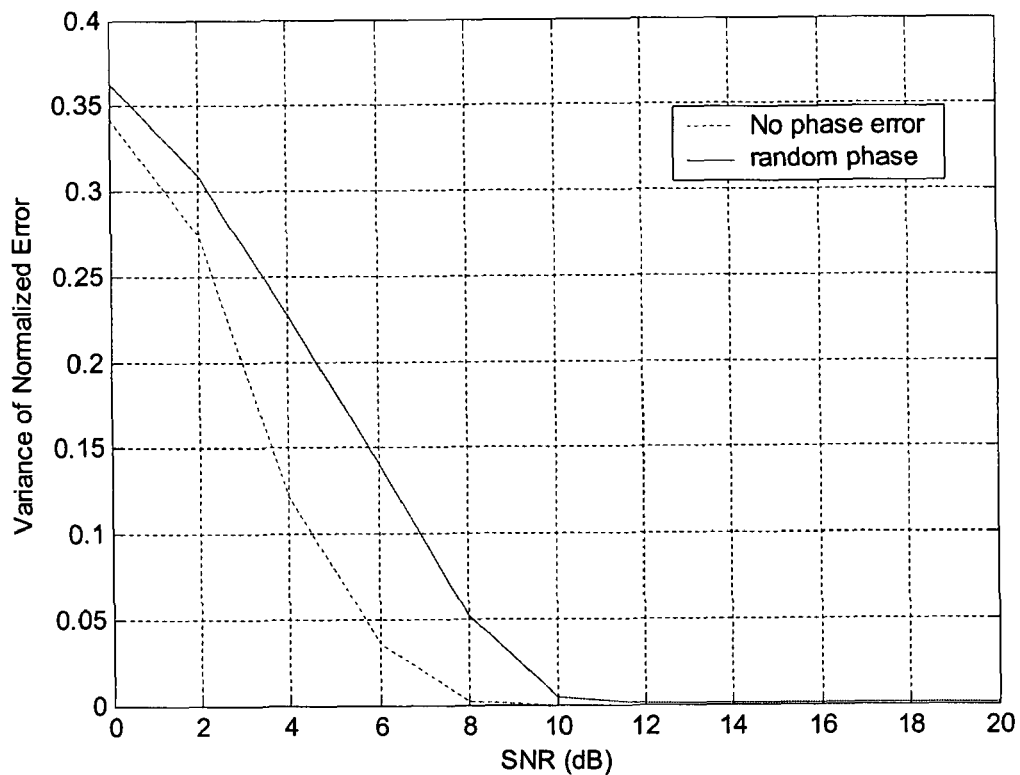
FIG. 2 is a graph that illustrates variance of normalized error versus SNR for an FFT scheme with and without phase mismatch between sub-bands according to embodiments of the invention.

In this section simulation results are provided to illustrate the performance of exemplary embodiments of the inventive subject matter in the presence of noise and phase mismatch. For the purpose of the exemplary simulations, a multi-band system with N=4 sub-bands is assumed. Further, it is assumed that the PN sequence is used as the preamble in the multi-band OFDM system for delay estimation as described in "Multi-band OFDM: merged proposal #1,". FIG. 1 shows the variance of the normalized error versus signal to noise ratio (SNR) for both an averaging scheme that averages N receptions, and an exemplary embodiment of the inventive subject matter. The SNR is defined as $E_s/N_0$ where $E_s$ and $N_0$ are defined in equation (2). FIG. 2 shows that in a comparatively high SNR regime (e.g. SNR>6 dB in some embodiments), where the CRLB is a tight bound, the systems and methods according to various embodiments of the inventive subject matter may outperform the averaging method.

As noted above, Equation (8) illustrates how the systems and methods of some embodiments use the information of the delay that is in the phases of the received signals to refine the delay estimation. Any phase error due to oscillator frequency mismatch when switching from one sub-band to another may affect the performance. In FIG. 2 the variance of normalized error versus signal to noise ratio (SNR) for both a system without phase error and a system with random phase when switching from one band to another is plotted. The random phase is assumed to be uniformly distributed in $[-\pi,\pi]$ and different phases in different sub-channels are independent. FIG. 2 shows that the effect of phase errors is higher in low and middle SNR regime.

CONCLUSION

Systems and methods for achieving a time resolution of inversely proportional to the total bandwidth in a multi-band system have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description.

What is claimed is:

1. A method for communications, the method comprising:
receiving a plurality of sub-band signals of a multi-band signal, wherein each of the plurality of sub-band signals has a corresponding base-band, each of the corresponding base-bands comprising a same base-band signal, and each of the same base-band signals are received at different tie intervals in each sub-band;
passing the plurality of sub-band signals through a plurality of matched filters to produce a plurality of filter outputs;
sampling the outputs of the plurality of matched filters to generate a plurality of sampled filter outputs;
aligning the plurality of sampled filter outputs into a matrix Y wherein matrix Y is aligned such that $Y(m,n)=y_m(n/w_s)$ where $y_m$ comprises a sub-band signal output of index m of a matched filter, n is a time index, and $w_s$ comprises a sampling rate;
applying an inverse FFT along sub-band indexes of matrix Y to produce a matrix Z; and
estimating a signal delay by determining a maximum of the plurality of sampled filter outputs in matrix Z after application of the inverse FFT.

2. The method of claim 1, further comprising:
receiving an estimate of phase mismatch; and
compensating for the phase mismatch using the estimate after aligning the plurality of sampled filter outputs and before applying the inverse FFT.

3. The method of claim 1, wherein estimating the signal delay includes determining time index n and index m where the matrix Z has a maximum.

4. The method of claim 1, wherein the signal delay is determined according to index m and time index n where matrix Z has a maximum, the signal delay determined according to the formula $$\text{signal delay}=(m+Nn)/(Nw_s)$$

where N comprises the number of sub-band signals.

5. A system for providing high time resolution signal multi-band communication, the system comprising:
one or more processors;
a memory including instructions, which when executed by the one or more processors, cause the one or more processors to:
receive a plurality of sub-band signals of a multi-band signal, wherein each of the plurality of sub-band signals has a corresponding base-band, each of the corresponding base-bands comprising a same base-band signal, and each of the same base-band signals are received at different tie intervals in each sub-band;
pass the plurality of sub-band signals through a plurality of matched filters to produce a plurality of filter outputs;
sample the plurality of filter outputs to generate a plurality of sampled filter outputs;
align the plurality of sampled filter outputs into a matrix Y wherein matrix Y is aligned such that $Y(m,n)=y_m(n/w_s)$ where $y_m$ comprises a sub-band signal output of index m of a matched filter, n is a time index, and $w_s$ comprises a sampling rate;
apply an inverse FFT along sub-band indexes of matrix Y to produce a matrix Z; and
estimate a signal delay based on matrix Z.

6. The system of claim 5, comprising the memory including instructions, which when executed by the one or more processors, cause the one or more processors to:
receive an estimate of phase mismatch; and
compensate for the phase mismatch in matrix Y.

* * * * *